United States Patent
Brown

(10) Patent No.: US 7,697,698 B2
(45) Date of Patent: Apr. 13, 2010

(54) SOUND-BASED VEHICLE SAFETY SYSTEM

(76) Inventor: William Sumner Brown, 35 Ross Rd., Belmont, MA (US) 02478-2114

( * ) Notice: Subject to any disclaimer, the term of this patent is extended or adjusted under 35 U.S.C. 154(b) by 1027 days.

(21) Appl. No.: 10/646,959

(22) Filed: Aug. 22, 2003

(65) Prior Publication Data

US 2005/0041819 A1  Feb. 24, 2005

(51) Int. Cl.
*H04B 1/00* (2006.01)

(52) U.S. Cl. .............. 381/86; 381/57; 381/365; 381/92; 340/435; 340/903

(58) Field of Classification Search .............. 381/86, 381/92, 56, 104, 107, 106, 365, 359, 361, 381/57, 98, 102, 77; 340/435, 436, 438, 340/456, 903; 367/129

See application file for complete search history.

(56) References Cited

U.S. PATENT DOCUMENTS

| | | | | |
|---|---|---|---|---|
| 2,131,593 | A * | 9/1938 | Marshall | ................ 181/148 |
| 3,158,835 | A | 11/1964 | Hipkins | |
| 3,626,365 | A * | 12/1971 | Press et al. | ................ 367/129 |
| 4,528,563 | A * | 7/1985 | Takeuchi | ................ 340/903 |
| 4,943,798 | A | 7/1990 | Wayne | |
| 5,173,881 | A * | 12/1992 | Sindle | ................ 367/101 |
| 5,204,971 | A * | 4/1993 | Takahashi et al. | ........ 455/185.1 |
| 5,278,553 | A | 1/1994 | Cornett | |
| 5,377,276 | A * | 12/1994 | Terai et al. | ................ 381/71.11 |
| 5,917,920 | A * | 6/1999 | Humphries | ................ 381/86 |
| 5,979,586 | A * | 11/1999 | Farmer et al. | ................ 180/274 |
| 6,097,285 | A * | 8/2000 | Curtin | ................ 340/436 |
| 6,266,423 | B1 * | 7/2001 | Werrbach | ................ 381/108 |
| 6,325,173 | B1 | 12/2001 | Miller | |
| 6,388,565 | B1 | 5/2002 | Bernhard | |
| 6,407,733 | B1 * | 6/2002 | Kawakami | ................ 345/204 |
| 6,731,204 | B2 * | 5/2004 | Lehmann | ................ 340/435 |
| 6,876,298 | B2 * | 4/2005 | Litkouhi et al. | ............ 340/435 |
| 7,062,060 | B2 * | 6/2006 | Hosono et al. | ............ 381/389 |
| 2002/0150262 | A1* | 10/2002 | Carter | ................ 381/86 |
| 2003/0108212 | A1* | 6/2003 | Yun | ................ 381/86 |

* cited by examiner

*Primary Examiner*—Vivian Chin
*Assistant Examiner*—Jason R Kurr

(57) ABSTRACT

A motor vehicle safety device allows the driver to hear nearby vehicles, so the driver can tell by ear when vehicles are in his blind spots, without significantly increasing the sound level inside the vehicle when there are no vehicles close to the host vehicle's blind spot. One benefit of this invention is the blind spot alert, or blind spot warning. Another benefit is that, because this invention communicates aural information from the host vehicle's environment to the driver, the driving experience is sensually richer and more interesting. The driver remains more alert and focused on the driving task. Elements of this invention, all of which are inexpensive, include directionally selective microphones (20) mounted on the vehicle, electronic signal processing (22), and loudspeakers (24) that are mounted close to the ears of the driver.

19 Claims, 8 Drawing Sheets

SOUND-BASED VEHICLE SAFETY SYSTEM

FEDERALLY SPONSORED RESEARCH

Not Applicable

SEQUENCE LISTING OR PROGRAM

Not Applicable

BACKGROUND

1. Field of Invention

This is a motor vehicle safety device that warns of vehicles in the driver's blind-spot.

2. Prior Art

Drivers of motor vehicles should be aware of other nearby vehicles, particularly when they are changing lanes on a multilane highway. Rearview mirrors, required safety equipment for automobiles, address the need drivers have to monitor the traffic situation behind them. Some drivers have difficulty making adequate use of their rearview mirrors. One problem arises when another vehicles is close to them in an adjacent lane, slightly behind the driver's vehicle, so the nearby vehicle is not visible in the inside rearview mirror and is not visible in the driver's peripheral vision when the driver is looking straight ahead. This is the so-called blind-spot problem. Another related problem is that some drivers do not check their rearview mirror every few seconds to continually update their knowledge about the traffic situation behind them. These problems become worse when distractions, such as cell phone conversations or disruptive children, compete for the driver's attention. These problems also worsen when long trips fatigue drivers.

Traffic safety experts and people working in the automobile industry recognize the blind-spot problem. Systems have been developed, in addition to rearview mirrors, to address this problem. Typical prior-art systems, represented by U.S. Pat. No. 6,388,565, have sensors, signal processing, and a driver interface. These three elements in the prior art systems have problems what retard widespread use. The sensors are typically technically advanced and sophisticated devices such as radar or ultrasound. These technically sophisticated sensors are generally expensive, which is a problem for widespread deployment. Another disadvantage of technically sophisticated sensors is that they generally require technically sophisticated signal processing. For a system that uses, for example, radar, the signal processing must either determine when a vehicle is in the blind-spot, or it must present data that will allow the driver to determine a blind-spot presence. Making a safety system responsible for interpreting the sensor data for the driver is risky. False warning mistakes annoy the driver, and mistakes of missed vehicles are dangerous. Different cases that need to be considered make interpretation difficult. For example, the system will detect cars in the blind spot when stuck in traffic jams or when in a city; but warnings sent to the driver in these situations might be unwelcome. The interface to the driver is typically a warning such as a flashing light, a sound, or a vibration that the driver feels. The interface must provide a positive warning to the driver without annoying the driver. An interface that is helpful without being annoying is difficult.

The present invention uses tire noise of nearby vehicles to give blind-spot warnings. U.S. Pat. No. 3,158,835 has many elements of the present invention. However, anyone implementing the system taught by U.S. Pat. No. 3,158,835 would find that the sounds presented by the system that originate from the host vehicle would limit usefulness of the system. U.S. Pat. No. 3,158,835 does not adequately teach how to discriminate between the sounds from the host vehicle and the useful sounds of nearby vehicles. Perhaps because sources of constant noise are annoying, there are no known direct descendants of U.S. Pat. No. 3,158,835, and it has not been developed into an available product. The philosophy of quieting host noise to enhance the usefulness of environmental noise for safety is shown in U.S. Pat. No. 6,325,173 that shows the use of wind screens in front of bicyclists' ears so they can better hear overtaking cars. The car safety invention described here differs from the bicycle windscreen patent because it teaches how to make useful sounds available to someone operating a vehicle inside a sound-blocking enclosure.

Another prior art, U.S. Pat. No. 4,943,798 and similar patents, uses many of the same elements of this invention but for the purpose of monitoring the mechanical health of remote tires and wheels on tractor trailer trucks.

Another prior art, U.S. Pat. No. 5,278,553, uses microphones outside a car. This patent teaches how to warn a deaf driver, or a driver listening to a loud sound system, when an emergency vehicle's siren is sounding nearby. The purpose of this patent, the nature of the signal processing, and the interface to the driver are all different from the present invention.

The near absence of prior art blind-spot warning systems that use tire noise is striking. This absence is due in part to basic goals and assumptions that guide the automotive industry. Modern automobiles are quiet inside. They are designed to block road or tire noise, and wind noise. Most people judge quiet cars to be good, and quieter cars to be better. The ability to keep passenger compartments quiet has been aided by the widespread use of automobile air conditioners so windows often remain closed in all types of weather, particularly at highway speeds. The automobile industry considers road noise, in particular, to be a nuisance with no redeeming value. The use of road noise as a useful and interesting sensual input is a paradigm shift for the automotive industry. This helps explain why the use of tire noise to alert drivers to vehicles in their blind-spot has not been pursued by the automotive industry, but instead was demonstrated by a bicycle rider who was able to build a demonstration in his basement from inexpensive components.

Objects and Advantages

This invention alerts a driver to vehicles in his blind spots by allowing the driver to hear nearby vehicles. Another object of this invention is to help drivers to be more alert by making driving a more sensually rich experience. Another object of this invention is to not annoy drivers with useless noise. A further object of this invention is to make driving more interesting.

This invention can be implemented with inexpensive hardware. The sensors are electret microphones in one demonstration implementation. The signal processing is relatively simple because this system does not make any decisions concerning the need to warn the driver about blind-spot intrusions. The data is presented to the driver without interpretation. The driver provides the interpretation function. Also, the signal processing need use only audio frequency signals, which are easy to manipulate.

The interface is straightforward. The driver hears sounds that seem to come from nearby vehicles. The sounds actually come from inexpensive loudspeakers. These sounds resemble the sounds that would be heard from nearby vehicles if the noise-blocking passenger compartment were not in the way. A driver using this system does not perceive any increase in wind noise or tire noise coming from his vehicle. The sounds from this safety system are of much higher quality, that is, free from extraneous noise, than what a driver would hear if she opened her windows at highway speeds. Drivers find the sounds made by this system, which seem to come from the highway environment, easy to interpret, useful, and interesting.

This system does not noticeably add objectionable noise to the passenger compartment. By using directionally selective microphones and electronic signal processing that exploits the directional properties of the microphones, the system essentially rejects noise coming from the host vehicle. The only sounds that the driver notices coming from the safety system are useful sounds from nearby vehicles.

The data interpretation function is done by the driver. This is an important point that makes this system superior to the prior art represented by U.S. Pat. No. 6,388,565. People are extremely good at interpreting sounds from activities happening close to them, when the sounds are not blocked by an enclosure. This ability to interpret sounds is built into people's neurological system. It operates naturally and it operates unconsciously, that is, without conscious effort. New sounds coming from behind have a high priority ability to focus attention. To say this another way, new sounds coming from behind are automatically considered to be very important by primitive parts of the human brain. This ability does not need to be learned. The ability to accurately and automatically interpret sounds that correspond to environmental situations is shared by many animals. This remarkable ability is the result of millions of years of evolution. The vehicle safety system described here makes use of this ability.

Another advantage of this invention is that drivers find that using this device is interesting. Drivers appreciate the additional sensual inputs provided, not only for the safety benefit, but because the sounds make driving more fun. Being able to hear clearly what is happening nearby is a welcome, natural ability enjoyed by people who have normal hearing, and sadly missed by people who are hearing impaired. No one, for example, would consider wearing ear plugs while making love, except perhaps if they had been married for thirty years. People enjoy the sounds from this system because they mitigate the aural sensory deprivation caused by modern, sound-insulated cars.

One benefit of the sounds provided by this system being interesting is that drivers do not need to be encouraged or coerced to use the system. They enjoy using the system.

Another benefit of this invention is that because driving is more interesting when drivers can hear what is happening around them, drivers stay more alert and better focused on their driving tasks on long trips.

The sounds produced by this safety system need not interfere with traditional in-car activities. The driver has no difficulty conversing with passengers or listening to the car radio while using this system. Passengers are barely aware of the system's presence.

Microphones have advantages as sensors. They are inexpensive, the required signal processing for use in blind-spot warnings is simple, and microphones are adequate to do an excellent job for automobiles. However, there are applications for which passive microphones have limitations and for which cost is not a major concern. One example is a system to warn a pilot of nearby aircraft. The advantages of an interface that mimics natural sound could be combined with radar sensors, or any sensors that can detect objects and estimate their location.

DRAWING FIGURES

DETAILED DESCRIPTION

Figure 1:
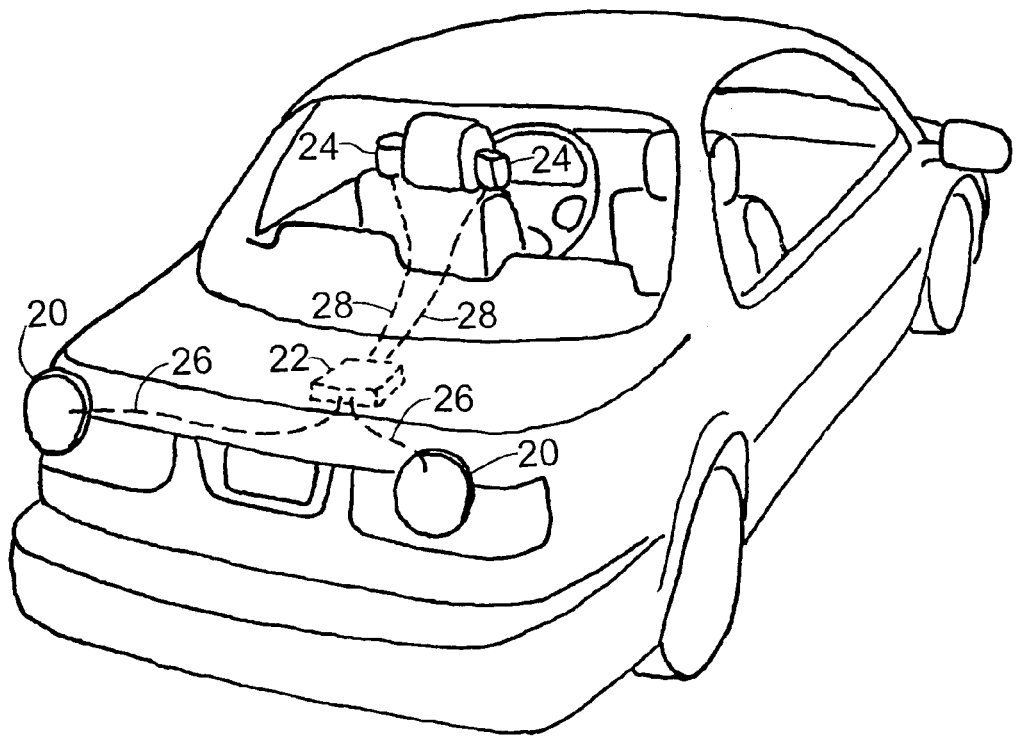
FIG. 1 shows an automobile with this sound-based safety system.
Figure 2:
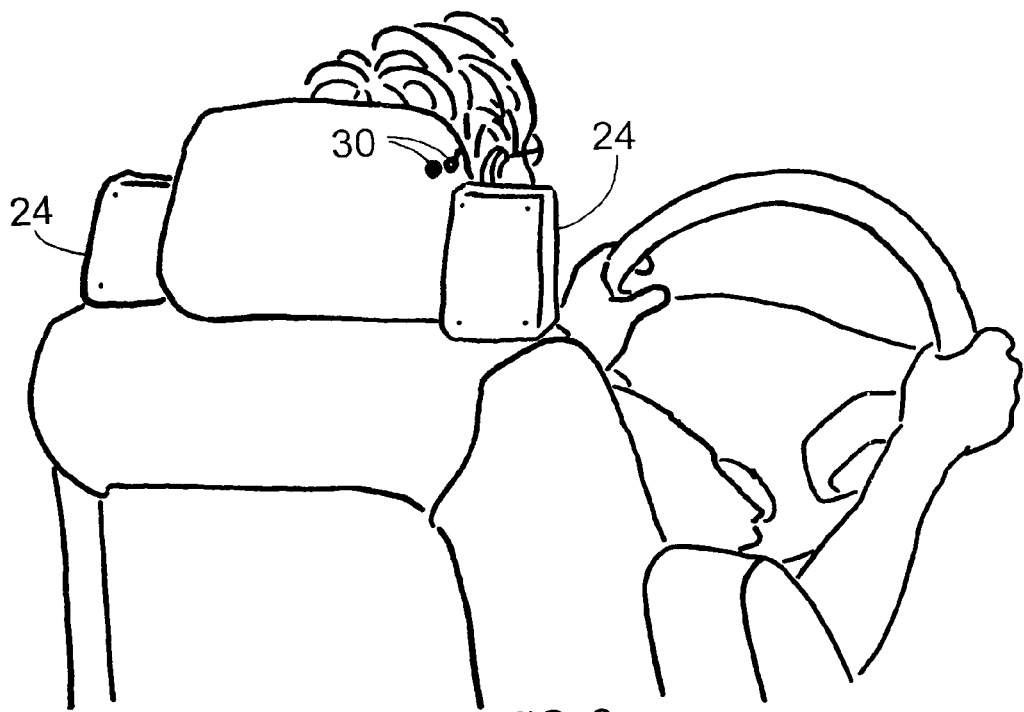
FIG. 2 shows two loudspeakers mounted on the driver's seat.

FIGS. 1 and 2—Preferred Embodiment

FIG. 1 shows the rear of an automobile, the host vehicle for a sound-based safety system, with two directionally discriminating microphones 20 mounted on the back, electronic signal processing 22 inside the car, two loudspeakers 24 mounted on the driver's seat beside the headrest, interconnecting wiring 26 between the microphones 20 and signal processing 22, and interconnection wiring 28 between the signal processing 22 and loudspeakers 24. The microphones 20 on the back of the host vehicle are directional so that they respond strongly to sounds coming from vehicles near the host vehicle while responding only weakly to sounds coming from the host vehicle. The primary source of sound that this system uses is tire noise. The host vehicle produces tire noise and this is usually not a useful sound. By using directional microphones, the system provides a much clearer aural picture of the driving environment.

FIG. 2 shows the loudspeakers 24 mounted on the driver's seat so they are close to the driver's ears. This loudspeaker placement allows the system to easily and clearly convey location information to the driver. This loudspeaker placement has the further advantage that passengers in the vehicle are not generally aware of the sounds from the safety system. FIG. 2 also shows controls 30 mounted on the driver's seat headrest. This placement avoids changing the design of the dashboard or other control-intensive location in the vehicle. Further, this location of controls 30 near the safety system loudspeakers 24 is logical in that it is close to the mechanical embodiment of the system's interface to the driver. The controls 30 will be simple, perhaps a volume control and a single switch that will select either a normal mode of operation or a mode for people with asymmetrical left-right hearing. Once these two controls have been set, they will rarely need to be changed.

Directionally Discriminating Microphones

The objective of this sound-based safety system is to enable the driver to hear vehicles in his blind spots while not annoying the driver with sounds that originate from his own vehicle. Directionally discriminating microphones play an important role. Directionally discriminating microphones are preferentially sensitive to sounds that come from certain orientations and discriminate against other sounds. The directionally discriminating microphones of this system are aimed at vehicles behind and beside the host vehicle and discriminate against sounds that come from the host vehicle.

The directionally discriminating microphones for this safety system can be implemented in several ways. For demonstrating the principles of this invention without making irreversible modifications to an existing automobile, the microphones have been parabolic reflectors that mount on the car with magnets so the microphones can be placed, repositioned, and removed without modifying the car. These microphones are shown in FIG. 1. The microphones for the demonstration system were molded on a parabolic surface 15 centimeters in diameter at the outer edge of the mold, and the focal point of the parabola is 3.3 centimeters from the inside-most point of the parabola surface. In each reflector an electret microphones about 10 millimeters in diameter and 7 millimeters in length is mounted with its acoustic openings facing the innermost point of the parabola and about 3.2 cm from the innermost point of the reflector surface. The parabolic reflector and electret microphone are covered with a windscreen made from a fabric that is acoustically nearly transparent but which inhibits wind from blowing directly on the electret microphone. The windscreens reduces noise caused from air passing by the microphones due to the forward motion of the vehicle or due to wind. The fabric wind screens were treated to make them water-repellent, so the microphones operate properly in wet weather. The microphones are aimed so that the axes of the parabolic reflectors, that is the axis of maximum sensitivity to sound, point down about 5 degrees. The axes of the parabolic reflectors point slightly to the sides. The microphone on the right side points to the right by about ten degrees. The microphone on the left points to the left by about ten degrees. The microphones are positioned approximately as shown in FIG. 1.

Figure 3:
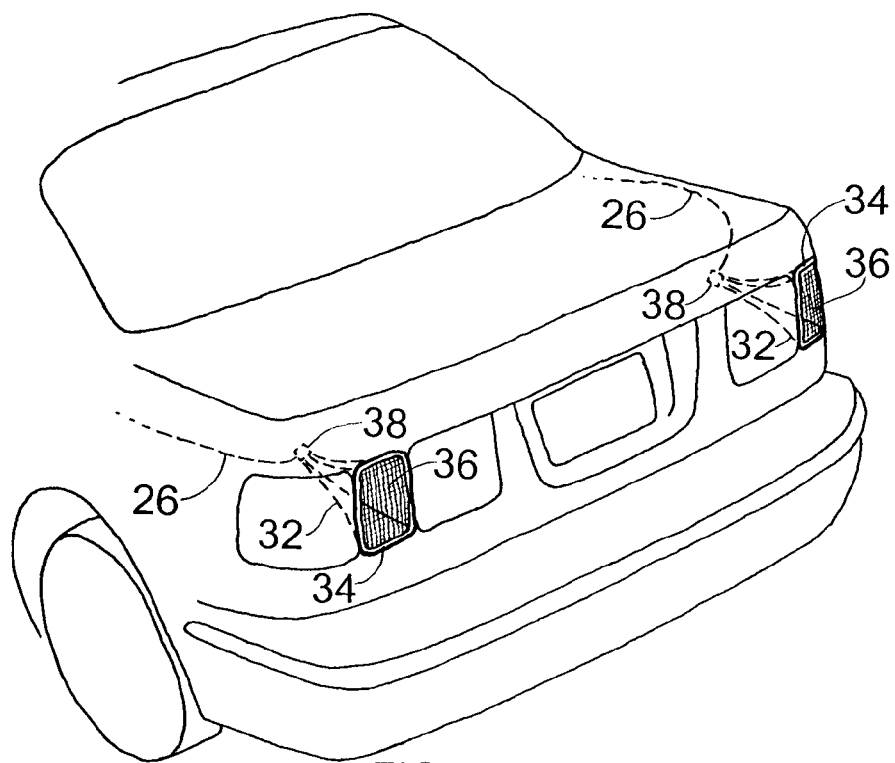
FIG. 3 shows directional microphones incorporated into an automobile's taillight assemblies.
Figure 4:
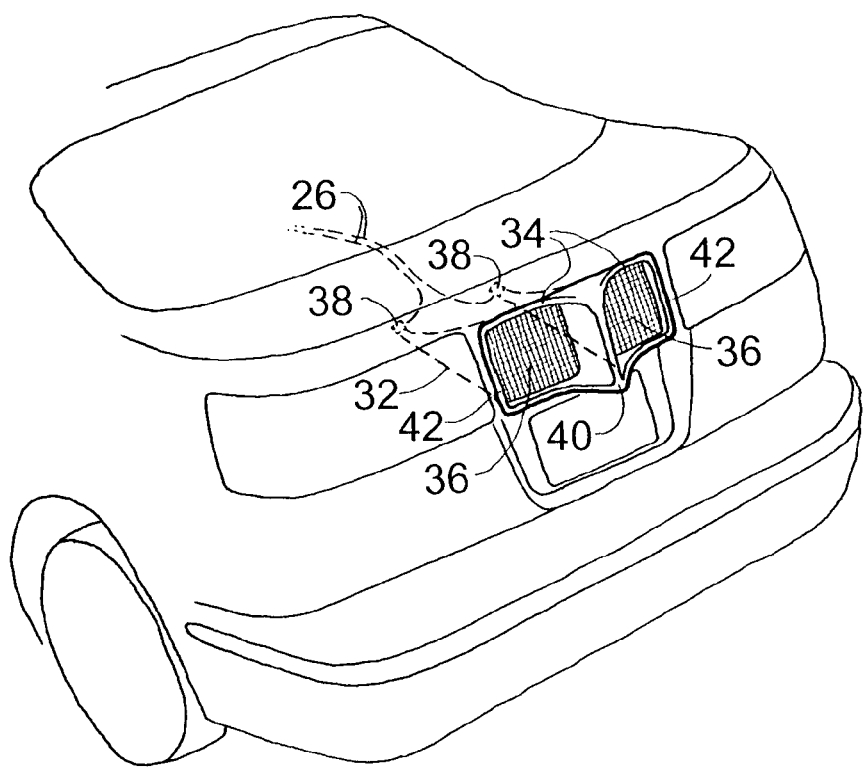
FIG. 4 shows another embodiment of directional microphones suitable for mounting on the rear of an automobile.

The parabolic reflector microphones described above have advantages for developing and demonstrating the system on an existing vehicle, but a better choice is available for a mass-produced product. FIGS. 3 and 4 each show two directional microphones. In FIG. 3 the microphones are incorporated into the taillight assemblies of an automobile. These microphones each have a tapered acoustic waveguide 32 with external opening 34. The waveguides curve upward inside the vehicle and end at electret microphones 38. The external openings 34 of the waveguides 32 are covered with screens 36. These screens prevent insects and other objects from entering the waveguides and they serve as windscreens that reduces noise from air moving past the vehicle as a result of vehicle motion and natural air currents from wind. Tapered acoustic waveguides are well known for their ability to make efficient loudspeakers by improving the acoustic impedance match between the loudspeaker driver and the air in the listening room. This safety invention exploits the directional properties of tapered acoustic waveguides. The external openings 34 of the waveguides 32 have dimensions that are large compared to the wavelengths of some portion of the spectrum of sounds of interest. For sounds that have wavelengths smaller than the dimensions of the openings, the microphones are directional. The same general relationship between size of the microphone, wavelengths of sound, and directionality apply to microphones with parabolic reflectors. By making the openings 34 of the waveguides 32 non-circular, the pattern of the directionality can be made non-circular. The waveguides 32 shown in FIG. 3 are curved so that the electret microphones 38 inside the automobile are protected from environmental hazards such as rain and car washes. That is, the electret microphone elements 38 that may be water-sensitive are protected from water because water will drain downhill, away from the water-sensitive elements. This arrangement mimics the way that the most sensitive parts of the human ear are protected.

FIG. 4 shows that the opening of the acoustic waveguides 32 can be substantially non-symmetric from left to right so that although the axes of the waveguides point nearly straight back, the response of the left microphone to a vehicle close to the host vehicle and on the left side of the host vehicle will be much stronger than the response of the right microphone. In FIG. 4 the two waveguides are mounted side-by-side near the center of the automobile, and their axes of maximum sensitivity both point straight back from the vehicle. Opening region 40 extends further toward the back of the vehicle than opening areas 42. Because of these asymmetrical openings, the two microphones respond differently to vehicles in the left and right blind spots, thus allowing the position of vehicles in the left and right blind spots to be accurately distinguished by ear.

Figure 5:
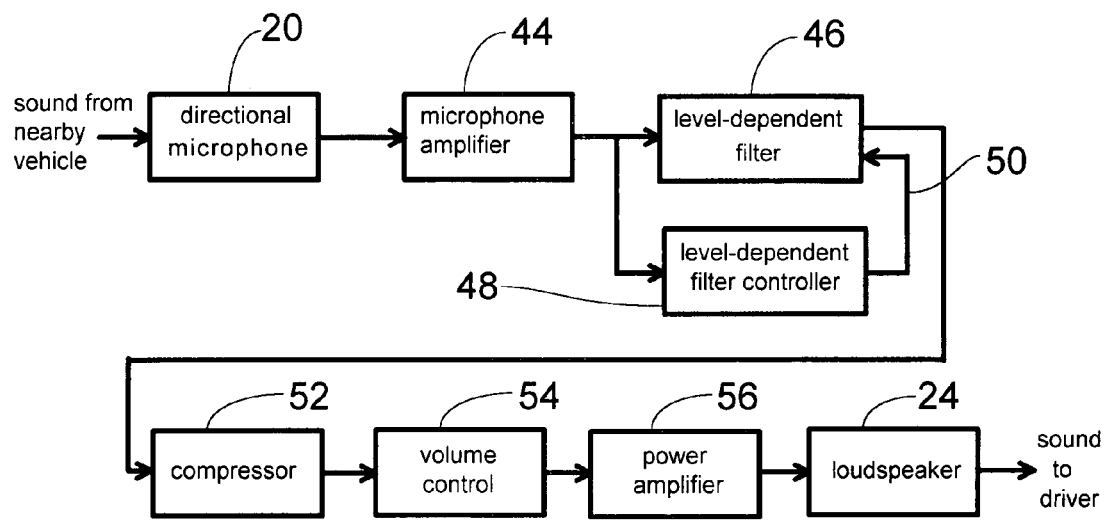
FIG. 5 is a block diagram of the preferred embodiment of this sound-based safety system.

Block Diagram of the Preferred Embodiment—FIG. 5

FIG. 5 shows a block diagram of one channel of the safety system. The blocks starting with microphone amplifier 44, including level-dependent filter 46, level-dependent filter controller 48, level-dependent filter controls 50, compressor 52, volume control 54, and power amplifier 56 are the signal processing portion of the system. The directional microphone 20, the level-dependent filter 46 and the level-dependent filter controller 48 are elements that work together to make the system relatively insensitive to noise originating from the host vehicle while making it sensitive to sounds coming from nearby vehicles.

FIG. 5 shows several less-common signal processing functions, which are represented in FIG. 5 by the level-dependent filter 46 and its controller 48, and the compressor 52. The level-dependent filter 46 complements the directional microphones 20 that are directional only for the higher portion of the frequency spectrum that represents sounds of interest. If the microphones were directionally selective for the entire spectrum of sounds for which the system responds, they would be quite large compared with the taillights of automobiles. By employing a level-dependent filter, larger microphones are unnecessary.

Figure 6:
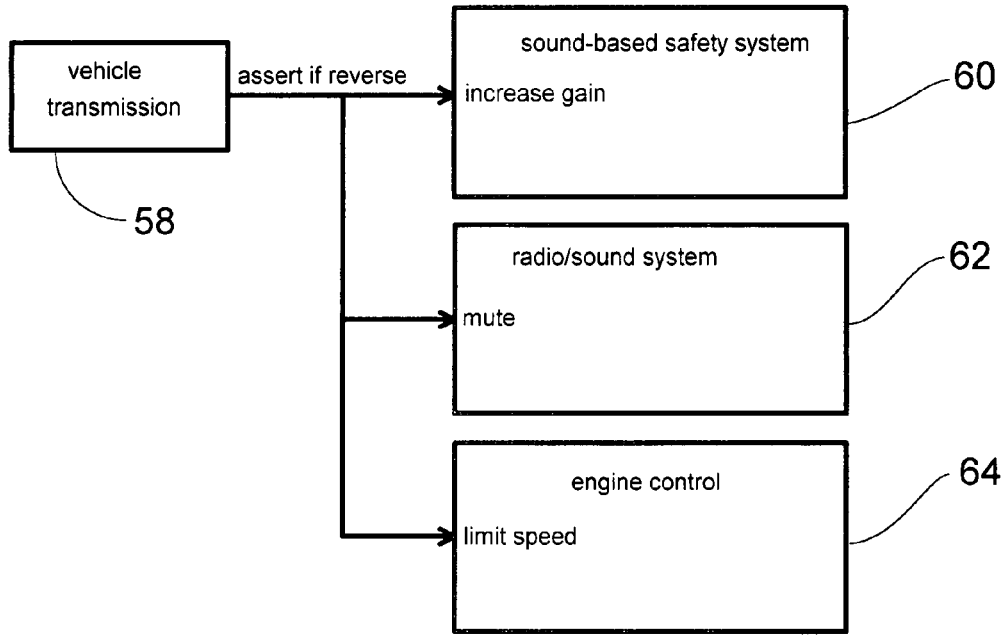
FIG. 6 shows a sound-based safety system joined with other automobile components to address the problem of children being injured by vehicles backing out of parking spots.

FIG. 6, a System Addressing Backing Accidents in Driveways

FIG. 6 shows a system, which includes the sound-based safety system, that reduces the danger of backing over children in driveways. The problem of injuries to children from people backing automobiles out of driveways may be addressed by the following combination of measures: (a) Limit reverse speed initially to a slow speed, perhaps walking speed of 3 miles per hour, by a governor, or to a low acceleration, (b) Automatically mute the car radio/sound system when the vehicle is backing, (c) Automatically increase the gain of the sound-based safety system when the vehicle is backing. These three measures are shown as a system, in block-diagram form, in FIG. 6. When the vehicle transmission 58 is in reverse, the sound-based safety system 60 has its gain increased, the radio sound system 62 is muted, and the vehicle speed or acceleration is limited by engine control 64. This allows a child playing behind the vehicle to scream and alert the driver before being overrun.

Level Dependent Filter and Controller

The level-dependent filter 46 has two basic specifications. First, when there are no loud sounds nearby, such as sounds produced by high-speed vehicles near the host vehicle, the level-dependent filter should have no noticeable effect on the signals passing through it. Second, when the host vehicle is traveling at speed and there is another vehicle nearby, the level-dependent filter should make the sounds from the nearby vehicle seem natural. The level-dependent filter in this case counteracts the frequency dependence of the directional microphones without losing the directional advantages of the microphones. One consequence of the first specification is that if the host vehicle is at rest and a person outside the vehicle and not on the axes of the microphones speaks, the driver will hear the person speaking and the sound will seem natural. This ability will help drivers from backing over children in driveways as noted in the system of FIG. 6.

Having described the objectives of the level-dependent filter, the structure of one embodiment can now be understood.

Figure 7:
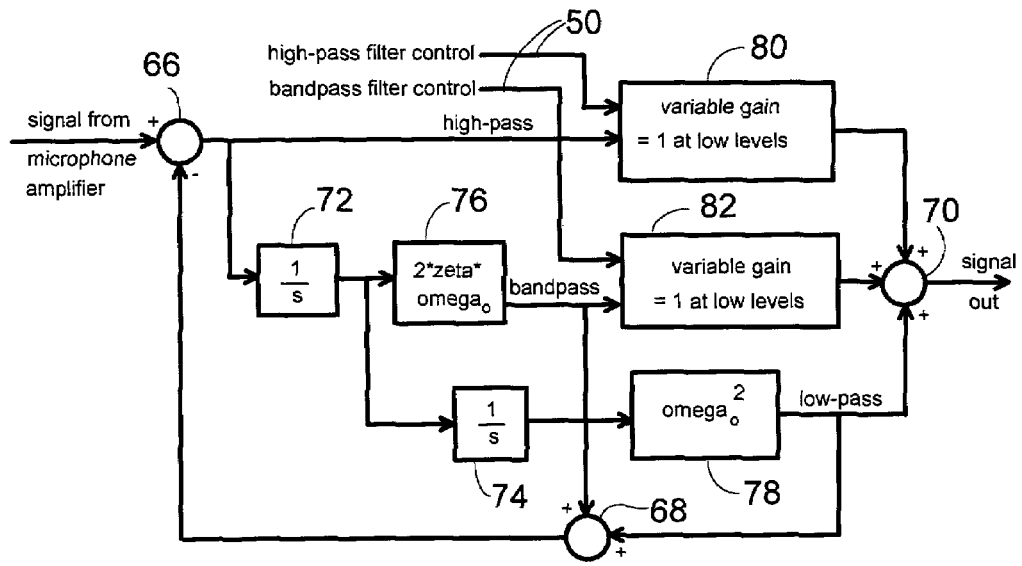
FIG. 7 is a block diagram of a level-dependent filter.

FIG. 7 shows a block diagram of a level-dependent filter. The notation of this block diagram is familiar to engineers who work with dynamic system designs. The blocks 72 and 74 with "1/s" inside are integrators. The "s" variable is the Laplace transform variable which, roughly speaking, represents frequency. The blocks 76 and 78 with "2*zeta*omega$_o$" and "omega$_o^2$" are gains. The circles 66, 68, and 70 are summing junctions. The four blocks 72, 74, 76, and 78, and two summing junctions 66 and 68 comprise a second order "state-space" filter with a high-pass output from summing junction 66, a bandpass output from gain block 76, and a low-pass output from gain block 78. The "resonant frequency" of the filter is omega$_o$ and the damping ratio is zeta. When the variable gain blocks 80 and 82 have gain of 1, the signal output, formed by summing three signals at summing junction 70, is the same as the input signal on the left of FIG. 7. When a vehicle is nearby and at speed, the control signals 50, from the level-dependent filter controller 48, change the gains of blocks 80 and 82 to make the sounds heard by the driver seem more natural. Without the level-dependent feature of this filter, vehicles would sound unnaturally high in frequency as the directional microphones responded preferentially to the higher frequencies of the vehicles that are near their axis of symmetry.

Figure 8:
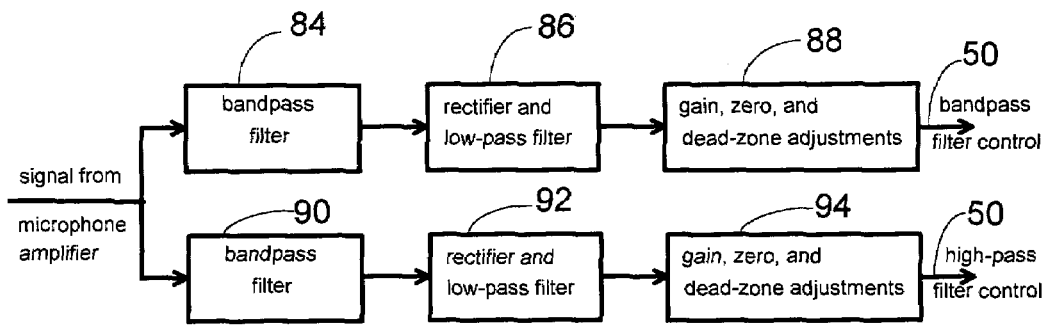
FIG. 8 is a block diagram of the controls for the level-dependent filter.

FIG. 8 shows the level-dependent filter controls in block diagram form. FIG. 8 shows two independent controls 50 provided to the level-dependent filter, called "bandpass filter control" and "high-pass filter control.". The bandpass filters 84 and 90 respond to signals in some selected band of frequencies. If there is adequate signal in the frequency region accepted by bandpass filter 84 or bandpass filter 90, the rectifier and low-pass filter 86 or 92 produces a change in a slowly varying, nearly direct-current signal. These near-direct-current signals are further provided with gain, zero, and possibly dead-zone adjustments, by blocks 88 and 94, to interface appropriately with the level-dependent filter. Because the control signals 50, provided to the level-dependent filter 46 to change gains, have slowly changing levels, there is no noticeable distortion caused by the level-dependent filters.

Figure 13:
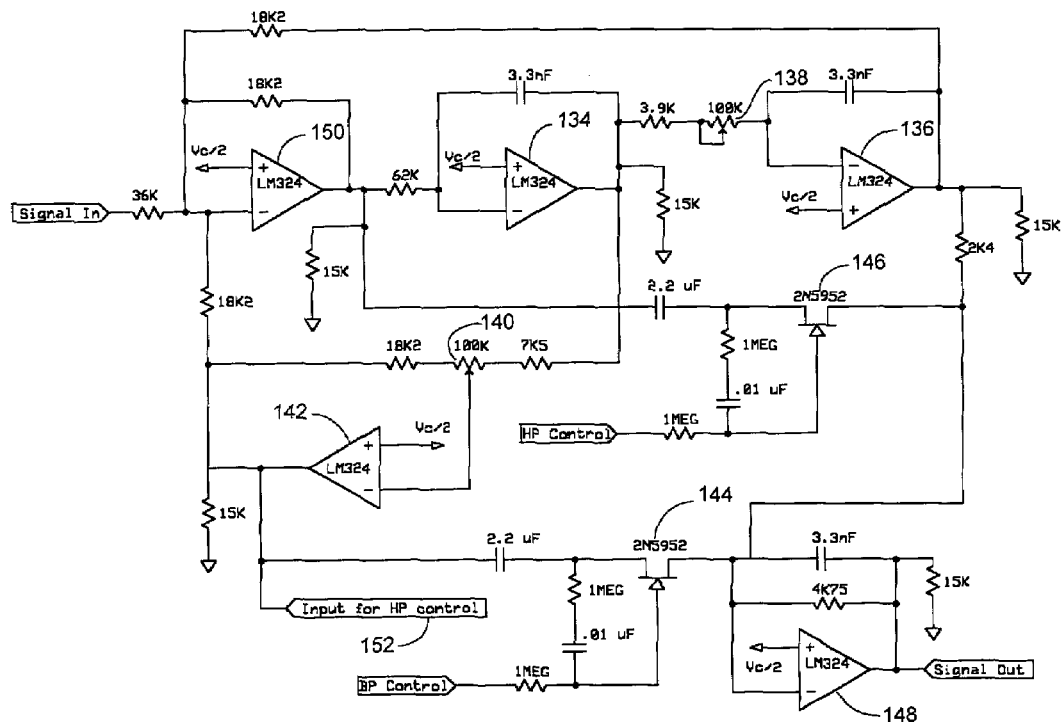
FIG. 13 is a circuit diagram of the level-dependent filter shown in FIG. 7.

FIG. 7 shows the mathematical concept of the level-dependent filter without showing a practical implementation. FIG. 13 is a circuit diagram of an implementation of a level-dependent filter using analog circuits. While the implementation shown here is well suited to testing and demonstrating the concepts of this invention, a shipped product would likely be implemented with digital signal processing.

Circuit Diagrams of Level Dependent Filter and Controller

Figure 14:
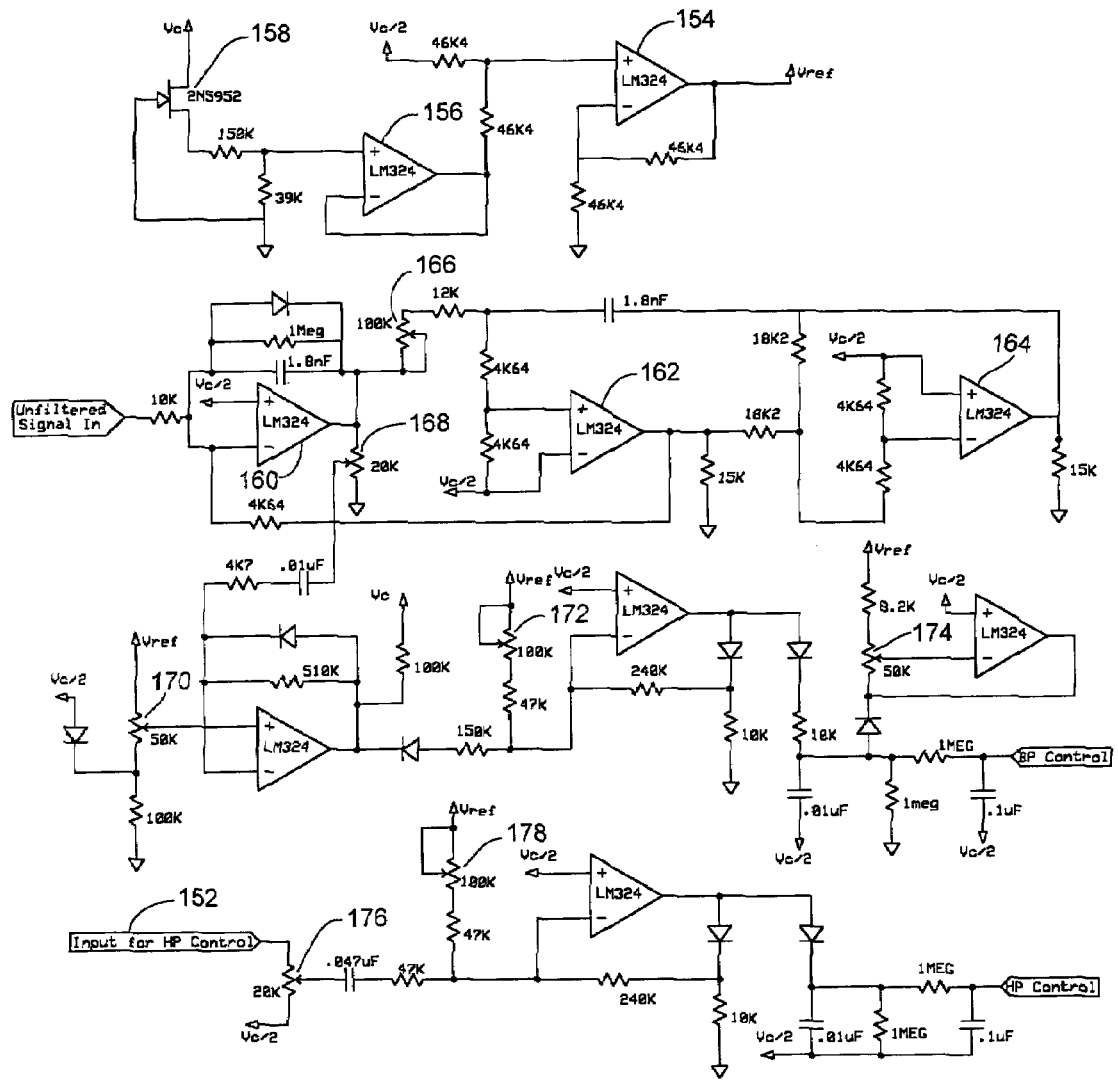
FIG. 14 is a circuit diagram of controls that mate with the circuit diagram of FIG. 13.
Figure 15:
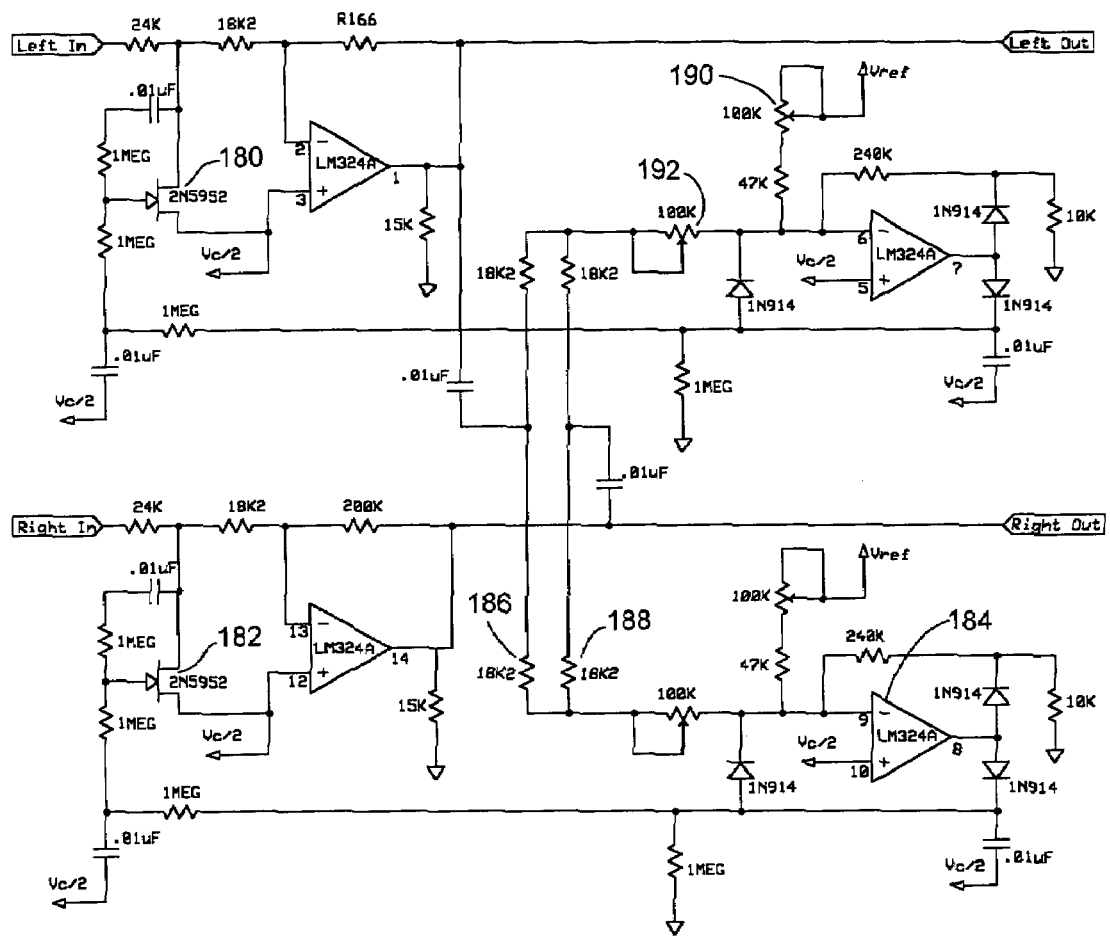
FIG. 15 is a circuit diagram of the compressor shown in FIG. 9.

The circuit diagrams of FIGS. 13, 14, and 15 are designed to operate with four AA size alkaline batteries as the power supply. The power supply voltage is designated as "Vc." The voltage designated as "Vc/2" is half the battery voltage. In FIG. 13, op amps 134 and 136 form the two integrators of the state space filter. Pot 138 adjusts the resonant frequency of the filter, and it also affects the damping ratio of the filter. Pot 138 adjusts the gain shown in FIG. 7 as "omega$_o^2$." This one pot adjusts the resonant frequency of all three paths of the filter, the low-pass, bandpass and high-pass paths. Pot 140 adjusts the damping ratio. Pot 140 with op amp 142 adjusts the gain shown in FIG. 7 as "2*zeta*omega$_o$." This adjustment changes the damping ratio for all three paths. These adjustments are useful for experimenting, but could be fixed for a shipped product. JFET 144 changes the gain of the bandpass path. JFET 146 changes the gain of the high frequency path. These two JFETs are used as voltage controlled resistors. The use of JFETs for this purpose is well-known and is described in application notes from JFET manufacturers. In order to obtain proper operation of the JFETs, the JFETs must be selected for proper on resistance and gate-source cutoff voltage, and the individual devices must have control voltages that come from circuits that have gain and offset adjustments, and these adjustments must be adjusted for the particular individual JFET that they control. This need for adjustments is of little concern for a demonstration implementation, but for a mass-produced product this would be a serious disadvantage. For this and other reasons, using digital signal processing to implement is attractive. Op amp 148 sums the low-pass, bandpass and high-pass paths. Op amp 150 performs the summing function that in FIG. 7 is done by summing junctions 66 and 68.

FIG. 14 shows a circuit diagram of an implementation of the level-dependent filter controller that works with the circuit of FIG. 13. Op amps 154 and 156 with JFET 158 and associated resistors provides a reference voltage that is used repeatedly to adjust the offset of the controls for the JFETs that are used as voltage controlled resistors. This reference voltage is independent of supply voltage and it has a temperature dependence that derives from JFET 158 in such a way that the properties of the system do not change noticeably with temperature. Op amps 160, 162, and 164 form the bandpass filter for the filter controller for the level-dependent filter's bandpass gain. The configuration shown allows a relatively high resonant frequency and a very low damping ratio to be implemented with op amps that have a modest gain-bandwidth. While this configuration was useful for experimental purposes, it is not necessary, and a simpler bandpass filter would be adequate. FIGS. 7 and 8 show two independent controls 50. The control for the level-dependent band pass filter path is the more important in the sense that it uses high frequency signals to control much lower frequency signal gains in the level-dependent filter, and thus implements the objective of obtaining natural-sounding output from directional microphones that have limited directional bandwidth.

The control for the gain of the high-pass path of the level-dependent filter makes the sound output of the system more interesting by giving the sounds produced an additional sense of depth. This high-pass section of the level-dependent filter changes the color of the sound of a nearby vehicle as it comes closer to the host car. The control for the high-pass path uses the bandpass filter of the level-dependent filter as the filter that selects the spectral region whose signal energy changes the gain of the level-dependent filter's high pass path. That is, signal 152 of FIG. 13 is also signal 152 of FIG. 14. For the bandpass controller, potentiometer 166 adjusts the resonant frequency of the bandpass filter, potentiometer 168 adjusts the gain of the bandpass controller, potentiometer 170 adjusts the dead zone, potentiometer 172 adjusts the control offset, and potentiometer 174 adjusts the high limit. For the high-pass controller, potentiometer 176 adjusts the gain, and potentiometer 178 adjusts the control offset.

Compressor

Figure 9:
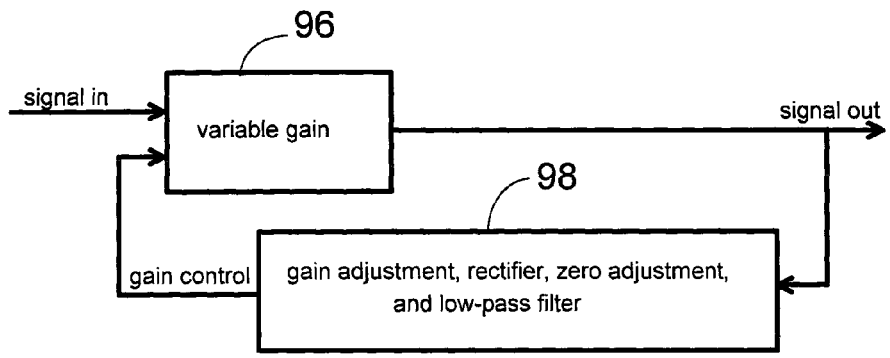
FIG. 9 is a block diagram of a compressor.

FIG. 9 is a block diagram of a compressor. The purpose of the compressor is to keep loud sounds from being uncomfortably loud. The problem addressed by the compressor is that occasionally there are unusually loud sounds from traffic, such as sounds made by a truck or a horn. The compressor turns down the volume on sounds that would otherwise be unpleasantly loud. The signal strength of the output of the compressor gets monitored by a rectifier and low-pass filter, 98. Based on the output signal strength, the gain at the input to the compressor gets adjusted by a variable gain element 96, with louder signals causing the gain to be reduced.

FIG. 15 is a circuit diagram of a compressor. This circuit shows two channels corresponding to the preferred embodiment of a left and a right channel. The JFETs 180 and 182 are used as voltage controlled resistors as is done in the level-dependent filter. The rectifier for the right channel, formed by op amp 184 and associated components, gets inputs from both the left and right channels through resistors 186 and 188. Using inputs from both channels as inputs to the gain control for each channel keeps the level of attenuation from the compressors in the left and right channel approximately balanced. For the left channel, potentiometer 190 adjusts offset and potentiometer 192 adjusts gain.

Signal Levels

Returning to FIG. 5, the microphone amplifier 44, volume control 54, and power amplifier 56 use routine technology. Amplifying microphone signals to drive a loudspeaker is well-known art. However, parts of this safety system, the level-dependent filter 46 and the level-dependent filter controller 48, are nonlinear and so signal levels are important. The gain of the microphone amplifier 44 for the demonstration system described here has a voltage gain of about 6 for use with an electret microphone with gain of −42 dB where 0 dB is 1 volt per pascal, mounted in a 15 centimeter diameter parabolic reflector. This gain is appropriate for dry pavement. For wet pavement, a gain of about 3 is appropriate because tires make more noise on wet pavement. These gains work well with the circuits shown in FIGS. 13 and 14.

Figure 10:
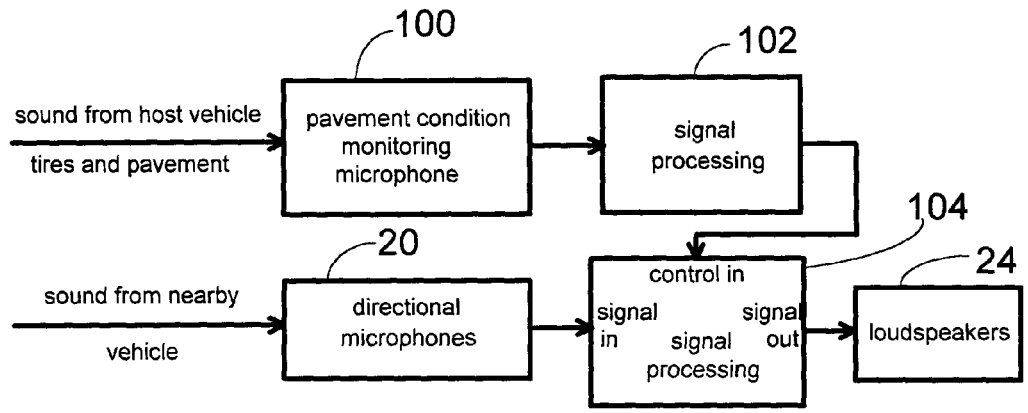
FIG. 10 is a block diagram of method to compensate for varying pavement surfaces.

FIG. 10, Automatically Monitoring Highway Acoustic Properties

FIG. 10 is a block diagram of a sound-based safety system such as is shown in FIG. 5 but with the addition of a microphone 100 whose purpose is to monitor the condition of the pavement and the speed of the host vehicle that together determine the tire noise characteristic of that combination of pavement and speed. The signal of the pavement-monitoring microphone 100 is used to change the signal processing properties of the sound-based safety system. The signal processing block 102 monitors the signal from the pavement monitoring microphone 100 to produce a nearly-dc control signal indicative of signal strength from the pavement monitoring microphone 100. This control signal from signal processing block 102 changes the characteristics of signal processing block 104. One use of the pavement-monitoring microphone is to change the gain of the microphone amplifiers 44 that are part of signal processing block 104. This gain, as has been noted, is profitably changed based on pavement conditions. Wet pavement makes more noise than dry pavement, and some pavements are noticeably more quiet than others. Making automatic gain adjustments would make this sound-based safety system sound more natural and more useful to the user. Also, the pavement-monitoring microphone would automatically increase gains at low speed to improve safety when backing up.

Additional Embodiment—A System with Generalized Sensors

Figure 11:
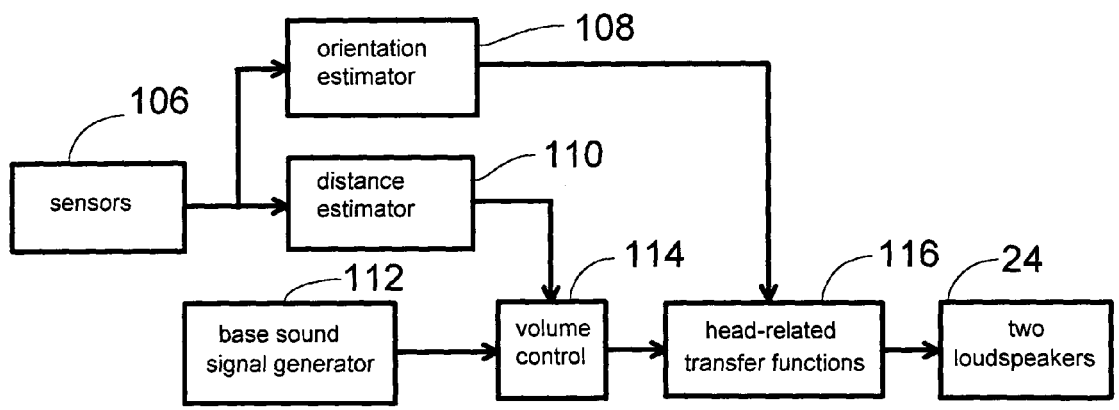
FIG. 11 is a block diagram of a safety system that has a human interface that is based on sound.

FIG. 11 shows another embodiment of this invention. This embodiment makes use of the previously described sound-based interface to the user, but with sensors 106 of any sort. In this embodiment, the user hears sounds that seem natural and that represent important nearby objects. However, the sensors are not necessarily microphones, and the sounds are synthesized, If radar sensors were used, for example, the signals sent to the loudspeakers 24 would be generated based not on directly sensed sounds from outside the system, but would be based on estimated locations of nearby items of interest. The sensors 106, orientation estimator 108 and distance estimator 110 would detect and estimate the location of items of interest. Then the system would generate signals that when played by the loudspeakers would represent the sensed objects in the object's estimated position. The objects could be assigned a base sound that could resemble tire noise, aircraft noise, ship propeller noise, or other sounds. A base sound generator 112 creates a signal representing this base sound. The volume of the sound is used to represent estimated distance. The volume is adjusted by the volume control 114 based on the estimated distance from the distance estimator 110. The estimated direction of the object would be indicated by processing the object's assigned sound signal through an appropriate "head-related transfer functions," 116. Such "head-related transfer functions" can be used, for example, to make sound convincingly seem to originate from behind the listener when the loudspeakers are in fact in front of the listener. These "head-related transfer functions" represent the effect of a listener's head on the sounds that reach the insides of his ears. These head-related effects of course are strongly dependent on where sounds originate relative to the orientation of the listener. Thus seemingly natural sounds can be generated from position information of any sort. Alternately an array of loudspeakers could be used in place of head related transfer functions 116 and two loudspeakers 24. These synthesized sounds can be used as an output of a warning system to alert someone that an object has come close enough to deserve their attention.

Additional Embodiment—A System for People with Asymmetrical Hearing

Figure 12:
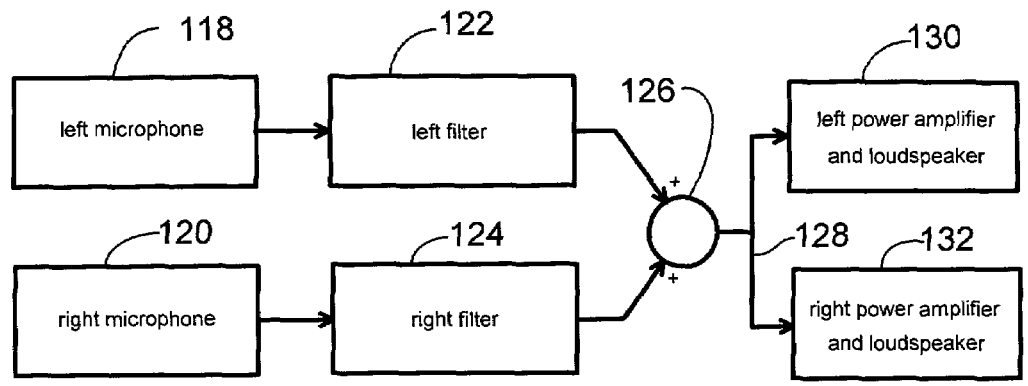
FIG. 12 is a block diagram of a sound-based safety system adapted for people with asymmetric hearing

The systems described so far require that the person using them have balanced hearing in their left and right ears. Some people have a hearing problem that makes them less able to localize the source of a sound. This limitation is addressed by the concept shown in FIG. 12. This system is a user-selectable configuration of the system of which one channel is shown in FIG. 5. The microphones 118 and 120 are the same directional microphones used for the previous configurations. The left filter 122 and right filter 124 represent almost all of the signal processing functions. For this configuration the left and right filters are deliberately different so as to give the tire noise from a vehicle in the left blind spot a different tonal color than the tire noise from a vehicle in the right blind spot. This is easy to do because tire noise has a broad frequency spectrum, so different parts of the spectrum can be emphasized by the left and right filters. The level-dependent filters can be used for this left-right difference so that low-level signals are not given unbalanced tonal color. The outputs from the left and right filters are summed together by summer 126. The output of the summer is a single common signal 128 that goes to both the left power amplifier and loudspeaker 130, and the right power amplifier and loudspeaker 132. Thus a person with hearing in only one ear can benefit from the system is several ways. She will be aware of nearby vehicles from sound coming from the system, and she will be able to differentiate by ear vehicles in the left and right blind spots because they sound different.

Conclusion, Ramifications, and Scope

The invention described here makes driving safer and more interesting by providing useful, natural-sounding aural information to the driver. Sounds that originate from nearby vehicles are useful. Sound that originate from the host vehicle is noise that provides no useful information about the traffic environment. The safety system must be able to discriminate against host vehicle noise, and this ability is a central technical challenge for this sound-based safety system.

The description above describes how a demonstration of this safety system has been implemented and suggests how a practical, mass-produced sound-based safety system can be realized. Extensions and useful implementation details will occur to those skilled in electronic, acoustic, and automotive arts. The directional microphones, for example, could be realized by using arrays of small individual transducers. Digital signal processing can be used in the signal processing.

The description above provides concrete examples of this invention and thus serves to aid understanding of the following claims. The claims alone describe the full scope and coverage of this invention.

I claim:

1. A safety system for a host vehicle whose driver can be protected from audible noise, said safety system comprising:
   (a) one or more directionally discriminating microphones on said host vehicle that discriminate against audible noise made by said host vehicle,
   (b) one or more loudspeakers positioned so that said driver can clearly hear sounds produced by said loudspeakers
   (c) signal processing means whose functions include amplifying signals from said microphones and feeding amplified signals from said microphones to said loudspeakers, said microphones sensing sounds made by objects in said host vehicles environment, and said safety system is configured so that said driver hears reproductions of the sounds made by nearby vehicles that are close enough to said host vehicle that said driver should be aware of said nearby vehicles for purposes of safe driving, said driver can approximately locate by ear the position of said nearby vehicles that he or she apparently hears, and said driver is generally unaware of sounds from said safety system that originate from said host vehicle, whereby said driver is made aware of the presence of said nearby vehicles behind or beside said host vehicle, and said directionally discriminating microphones in combination with said signal processing means greatly improve the quality of sounds provided to said driver so that said driver is not annoyed by additional noise from said host vehicle, said signal processing achieving said improvement in signal quality in part by continuously, or nearly continuously, changing the gain for at least one part of the audio spectrum based on signal intensity in another part of the audio spectrum, thus exploiting the directional property of said microphones and the frequency characteristics of the sound of vehicle tires rolling on pavement.

2. A safety system as in claim 1 wherein said loudspeakers are mounted in positions such that they are closer to said driver's ears than to the ears of other occupants of said host vehicle when seated in vehicle seats, whereby passenger in said host vehicle are generally not aware of sounds from said safety system.

3. A safety system as in claim 1 wherein said driver is protected from audible noise by a passenger compartment of said host vehicle, said loudspeakers are two or more in number, and at least one of said loudspeakers is mounted in a position that is closer to the left ear of said driver than to the right ear of said driver, and at least one other of said loudspeakers is mounted closer to the right ear of said driver than it is to the left ear of said driver, and said loudspeakers are positioned close to the driver's ears compared with distances to said passenger compartment windows and roof, and said loudspeakers close to the left ear receive signals that originated from said directionally discriminating microphones that are shaped, located and oriented so as to favor sounds originating from the left side of said host vehicle and said loudspeakers close to the right ear receive signals that originated from said directionally discriminating microphones that are shaped, located and oriented so as to favor sounds originating on the right side of said host vehicle, whereby said driver can easily determine by ear the location of said nearby vehicles.

4. A safety system as in claim 1 wherein said signal processing means includes a dynamic range compressing signal processing means whereby the amplification gain of said signal processing means, between the inputs from said microphones and outputs to said loudspeakers is automatically and progressively reduced as the signal levels increase, whereby mitigating unusually loud sounds.

5. A safety system as in claim 1, further including at least one pavement condition monitoring microphone deployed such that said pavement condition monitoring microphone senses predominately tire noise from said host vehicle, the signals from said pavement condition monitoring microphones being used to change properties of said signal processing means, whereby adjusting said safety system for variable conditions of pavement conditions, weather conditions, and the speed of said host vehicle.

6. A safety system as in claim 1 wherein said signal processing means includes means for automatically setting the sound volume of said safety system to a level sensitive enough to hear conversations outside said host vehicle when said host vehicle is moving slowly, whereby reducing the risk of injuring people while said host vehicle is moving backward.

7. A safety system as in claim 1 wherein said signal processing means includes means for automatically setting the sound volume of said safety system to a level sensitive enough to hear conversations outside said host vehicle when the transmission of said host vehicle is in reverse, whereby reducing the risk of injuring people while said host vehicle is moving backward.

8. A safety system as in claim 1, further including means for automatically reducing the sound volume of a radio or entertainment sound system of said host vehicle when the transmission of said host vehicle is in reverse, whereby reducing the risk of injuring people while said host vehicle is moving backward.

9. A safety system as in claim 1 wherein said signal processing means includes a volume control means that said driver can adjust to change the level of sound that reaches his or her ears from said loudspeakers for a given circumstance of sound producing objects outside and near said host vehicle.

10. A safety system as in claim 1 wherein said host vehicle has a driver's seat in a passenger compartment, further including driver changeable control means that affect the characteristics of said signal processing means, said driver changeable control means being mounted on said driver's seat or a head rest on said driver's seat.

11. A safety system as in claim 1 wherein at least one of said directionally discriminating microphones is a left microphone that is deployed to preferentially sense sounds that originate from the left side of said host vehicle, and at least one of said directionally discriminating microphones is a right microphone that is deployed to preferentially sense sounds that originate from the right side of said host vehicle, and said signal processing means include one filter means that predominately affects signals originating from said left microphone, and another filter means that predominately affects signals originating from said right microphone, and these said filter means for the left and right signals affect the signals from said left microphone and said right microphone differently, whereby these deliberately unmatched filters allow people with one ear more capable than the other to determine with one good ear on which side a nearby vehicle is located.

12. A safety system as in claim 11 wherein the signals from said unmatched filters are combined into a single signal before being converted to sound by said loudspeakers.

13. A safety system as in claim 1 wherein said signal processing means includes one or more level-dependent signal processing means that have frequency response properties that change based on a control signal, said control signal originating from said directionally discriminating microphones, said control signal responding to signal levels in a frequency region that is high enough whereby the directional properties of said directionally discriminating microphones are effective, whereby said control signal indicates a source of external sound that is not the host vehicle, said level-dependent signal processing means having as their signal input signals originating from said directionally discriminating microphones, said level-dependent signal processing means having outputs that go toward said loudspeakers, and said frequency response properties change at rates that are substantially below audio frequencies, whereby the sounds provided by said safety system to said driver are realistic representations of sounds made by nearby vehicles, and whereby signal components of lower frequencies than can be effectively selected by the directional properties of said directional microphones can be controlled by the directional properties of said directional microphones.

14. A safety system as in claim 13 wherein said level-dependent signal processing means has no noticeable effect tinder low sound level conditions, such as sound levels of a normal conversation near a slowly moving vehicle.

15. A safety system as in claim 1 wherein the directional properties of one or more of said directionally discriminating microphones are achieved by one or more tapered acoustic waveguides, with one microphone for each waveguide, wherein each said waveguide has its larger end opening in the rear of said host vehicle to the exterior of said host vehicle, and with the smaller end of said waveguide inside said host vehicle, and with said smaller end of said waveguide holding any components of said directionally discriminating microphone that are sensitive to water, thereby achieving directionally discriminating microphone properties and sheltering water sensitive components.

16. A safety system as in claim 15 wherein each opening of said large end of each said acoustic waveguide is shaped so that the spatial patterns of high selectivity have a desirable shape about the axes of highest sensitivity.

17. A safety system as in claim 15 wherein the directions of high sensitivity of said acoustic waveguides point nearly straight back from said host vehicle and the openings of said acoustic waveguides are substantially asymmetric from left to right so that for sounds originating to the sides of said host vehicle, substantially away from the direction of peak sensitivity, at least one of said microphones is more sensitive to sounds originating from the left of said host vehicle, and at least one of said microphones is more sensitive to sounds originating from the right of said host vehicle.

18. A safety system as in claim 15 wherein said large end openings of said tapered acoustic waveguides are covered by screens, whereby keeping insects and other objects out of said waveguides and reducing noise caused by air moving past said host vehicle.

19. A safety system for a host vehicle whose driver can be protected from audible noise, said safety system comprising:
 (a) one or more microphones on said host vehicle
 (b) one or more loudspeakers positioned so that said driver can clearly hear sounds produced by said loudspeakers
 (c) signal processing means
said microphones sensing sounds made by objects in said host vehicles environment, and said safety system is configured so that said driver hears reproductions of the sounds made by nearby vehicles that are close enough to said host vehicle that said driver should be aware of said nearby vehicles for purposes of safe driving, said driver can approximately locate by ear the position of said nearby vehicles that he or she apparently hears, whereby said driver is made aware of the presence of said nearby vehicles behind or beside said host vehicle, and said signal processing means includes a function that exploits the spectral nature of tire noise and the acoustic properties of said host vehicle and said nearby vehicles, and said function includes automatically changing gains in one part of the audible spectrum based on signal intensity in another part of the audible spectrum so as to make said driver less aware of sounds originating from said host vehicle.

* * * * *